Jan. 8, 1929.

A. F. DAY 1,698,154

PIPE SCRIBING INSTRUMENT

Filed Dec. 2, 1927

A. F. Day,
INVENTOR

BY John M. Spellman
ATTORNEY

Jan. 8, 1929.  1,698,154
A. F. DAY
PIPE SCRIBING INSTRUMENT
Filed Dec. 2, 1927   2 Sheets-Sheet 2
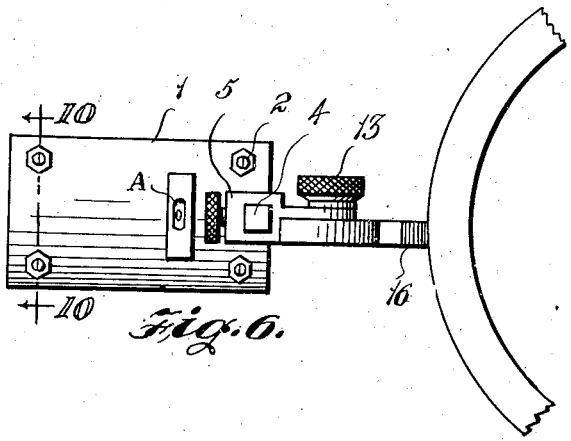
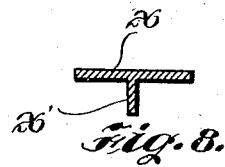
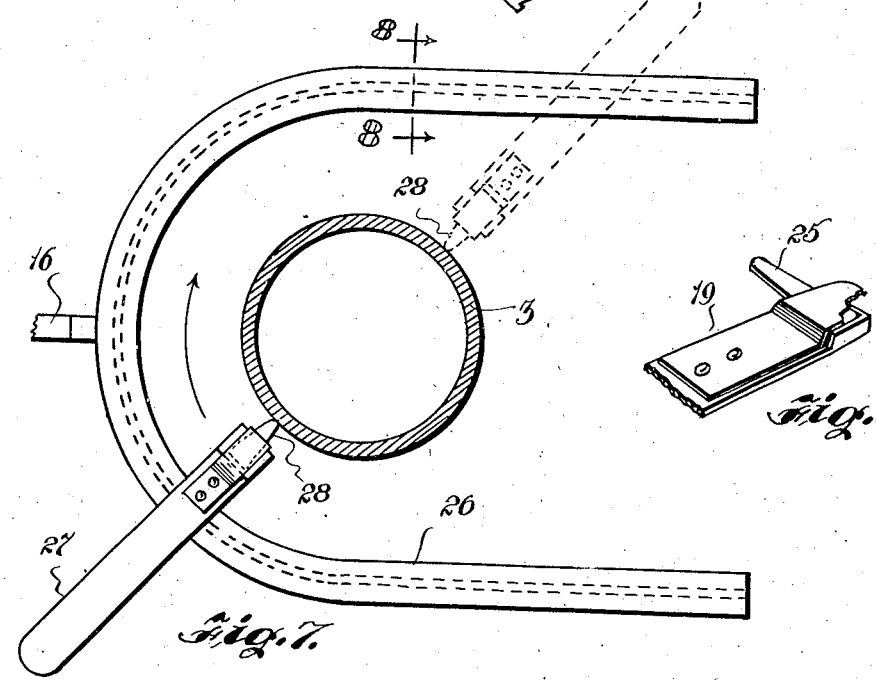
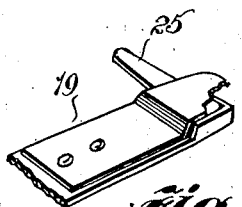
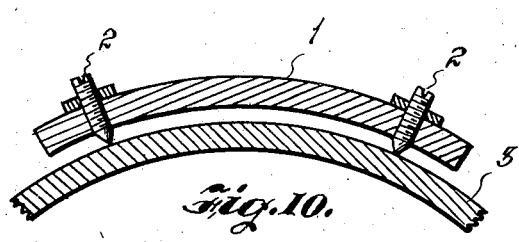
A. F. Day,
INVENTOR
BY John M. Spellman
ATTORNEY Patented Jan. 8, 1929.

1,698,154

UNITED STATES PATENT OFFICE.

ANDREW FRANKLIN DAY, OF DALLAS, TEXAS.

PIPE-SCRIBING INSTRUMENT.

Application filed December 2, 1927. Serial No. 237,180.

This invention relates to improvements in pipe degree squares or instruments for making a line on a pipe indicating accurately the portion of the pipe to be cut in fitting and joining one pipe or portion thereof to another.

The present invention involves the principle employed in applicant's co-pending application for pipe calipers, filed in the United States Patent Office on October 24, 1927, Serial Number 228,214.

The particular object of the present invention is to provide an instrument for defining lines or markings on a pipe at varied angles for joining two pipes together, particularly useful in making pipe connections in steam and gas connections in oil fields and in various other lines of work where it is necessary to cut pipe accurately in making such joints. After the mark is made by the instrument, the pipe may be cut along the line indicated and no further trimming is necessary to make a perfect joint.

For a more complete and full description of the invention, reference is made to the drawings hereunto annexed and made a part of this specification, and wherein:

Figures 6, 7, 8 and 10 illustrate various views of a modified form of the invention, Figure 6 being a partial plan view.

Figure 7 is a view similar to Figure 2.

Figure 8 is a cross-sectional view on the line 8—8, Figure 7.

Figure 9 is a detail sectional view of means for holding a marker, shown in Figure 2; and Figure 10 is a cross-sectional view on the line 10—10 of Figure 6.

Figure 5:
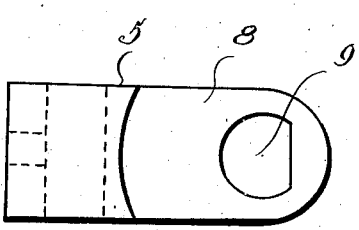
Figure 5 is a detail view of one of the parts shown in Figure 3.

Proceeding in accordance with the drawings and wherein different numerals are employed to designate the various parts of the invention, 1 denotes a curved, longitudinal plate with adjustable set screws 2 for engaging the pipe 3. Rigidly connected to or formed integrally with the plate is a vertical rod 4 of a squared formation in cross-section for engagement with a sleeve 5, the sleeve being interiorly recessed to complementally receive the rod 5, clearly shown in Figure 3. The sleeve has a threaded opening for the reception of a screw 6 having a knurled knob 7 for holding the sleeve in set position on the rod 4. The sleeve also includes a projecting part 8 with an opening 9, see Figure 5, for insertion of a pivoting and connecting element 10, the head of which indicated at 11 is circular and bears a scale 12, hereinafter referred to. A knurled nut 13 holds the parts together.

Figure 1:
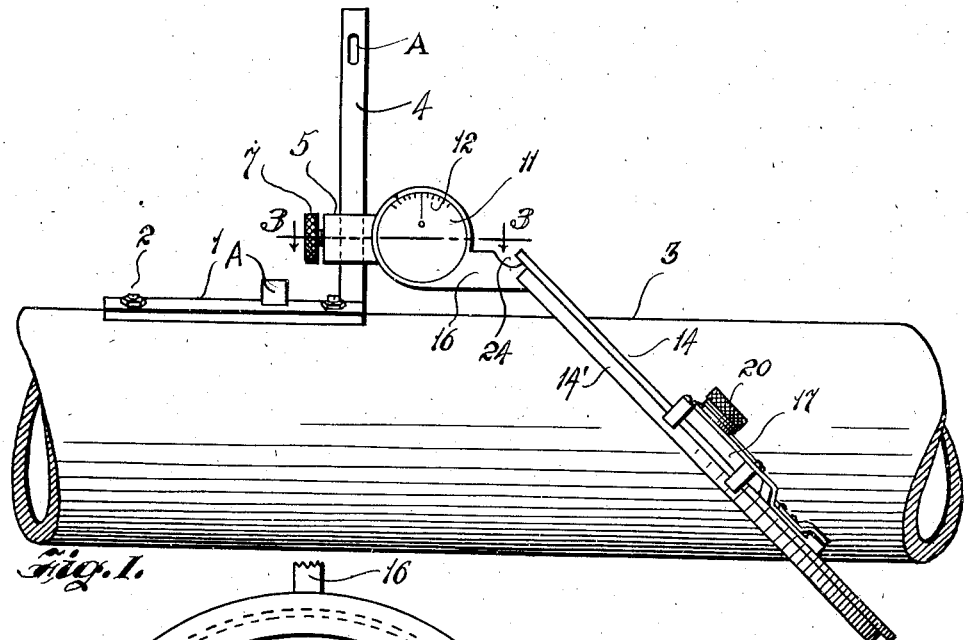
Figure 1 is a side elevational view of the instrument in position on a section of pipe.
Figure 2:
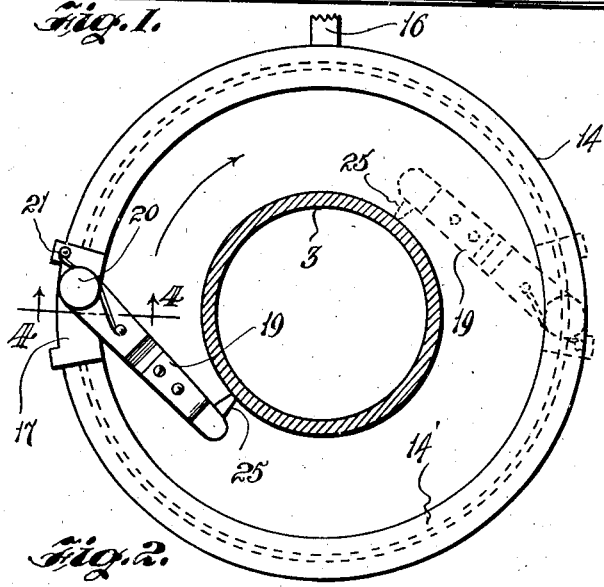
Figure 2 is a cross-sectional view through the pipe and indicating a top view of a guide ring.
Figure 3:
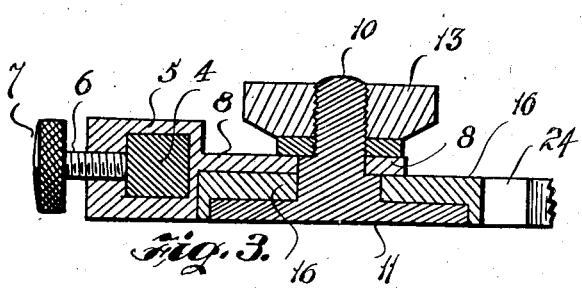
Figure 3 is a horizontal sectional view taken on the line 3—3 of Figure 1.

Referring to Figures 1 and 2: a ring 14, having an annularly centrally disposed rib 14' is provided for the purpose of guide means to guide the marker along and around the pipe 3. This ring is formed integrally with an arm, the latter being recessed as shown in Figure 3 to complementally receive the element 10, the head 11 and a portion of the shank thereof being countersunk in the arm 16. The element 10 passes through the arm 16, projecting part 8 of the sleeve 5 and the knob 13.

Figure 4:
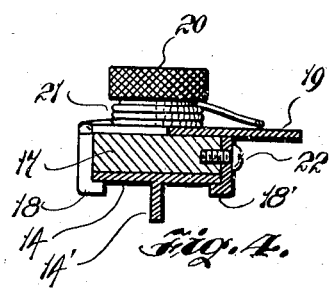
Figure 4 is a cross-sectional view through the ring at the point 4—4.

Seated upon and slidably arranged with the ring 14 is a clip 17, more clearly shown in Figure 4. The clip has flanges 18 to firmly hold the clip on the ring, yet loose enough to allow the clip to move freely around the ring. Pivoted to the clip is a finger 19. This finger has a knurled knob 20 around which is wound a spring 21—the ends of the spring being attached to the finger and to the clip—clearly shown in Figure 2. The clip flanges 18' are preferably secured to the clip by screws 22 for the purpose of placing the clip upon the ring in assembling the parts. The arm 16 has a curved notch 24 to permit the clip to freely pass in its travel around the ring. The finger 19 carries a marker 25 of soapstone or the like to mark the pipe on the line to be cut.

In Figure 7 is shown a modification of the invention. In this instance, in the place of the ring guide 14, there is provided a horseshoe or substantially U-shaped element 26 with a rib 26' formed integrally with or detachably connected to the arm 16 in the same manner as the ring. This enables the pipe to be cut at a longer angle than the ring guide, and includes a member 27 with a marking element 28. The member 27 is detached from the element 26 and may be grasped in the hand, the marker bearing against the pipe 3 and the member 27 lying flat and traveling along the top of the element 26 in making the mark.

The plate 1 and the rod 4 each have a spirit level A for setting the instrument correctly in place in connection with the gauge 12.

In operation, the plate 1 is seated upon the pipe 3 as shown in Figure 1, the sleeve 5 and the arm 16, carrying the guide element 14 or 26, are adjusted to desired position and secured in such positions by the screw 7 and nut 13. The finger 19 of the clip 17 is moved around the pipe by the knob 20 and the mark is made upon the pipe, all around the pipe. The same procedure is carried out in the modified form, except that the member 27 is held by the hand so that it will ride upon the element 26 with the marker bearing against the pipe.

The present disclosure illustrates a practical embodiment of the invention and of the principle involved, yet obviously other modifications may be made to come within the scope and meaning of the appended claim.

What is claimed is:

In a device of the class described, the combination with a plate for gripping a pipe, of a rod projecting from said plate, a sleeve slidably adjustable on said rod and having an extension, an arm supported on said extension, a ring secured to the outer end of said arm, said ring being adapted to encircle said pipe, said arm having its inner end pivoted to said extension for permitting angular adjustment of said ring relative to said pipe, a marker support slidably secured on said ring, and a finger pivoted to said support for carrying a marker to resiliently bear against said pipe to mark the same during the sliding movement of said marker support on said ring.

In testimony whereof I affix my signature.

ANDREW FRANKLIN DAY.